United States Patent [19]

Perry

[11] Patent Number: 5,180,565
[45] Date of Patent: * Jan. 19, 1993

[54] NO REDUCTION USING SUBLIMATION OF CYANURIC ACID

[76] Inventor: Robert A. Perry, P.O. Box 5024, Livermore, Calif. 94550

[*] Notice: The portion of the term of this patent subsequent to Mar. 15, 2005 has been disclaimed.

[21] Appl. No.: 491,996

[22] Filed: Mar. 12, 1990

Related U.S. Application Data

[60] Division of Ser. No. 154,247, Jan. 5, 1988, Pat. No. 4,908,193, which is a continuation-in-part of Ser. No. 859,951, May 5, 1986, Pat. No. 4,731,231.

[51] Int. Cl.⁵ .......................... C01B 21/00; B01J 8/00
[52] U.S. Cl. ..................................... 423/235; 423/239
[58] Field of Search ................... 423/235, 235 D, 239, 423/239 A

[56] References Cited

U.S. PATENT DOCUMENTS 4,731,231 3/1988 Perry .................................. 423/239
4,851,201 7/1989 Heap et al. .
4,861,567 8/1989 Heap et al. .

FOREIGN PATENT DOCUMENTS 54-28771 3/1979 Japan .................................. 423/235

OTHER PUBLICATIONS

Sarv et al., "Technical Paper: $NO_x$ reduction in an industrial-scale boiler by injecting cyanuric acid powder," 1989 Fall Meeting of the Western States Section/-The Combustion Institute, Livermore, Calif. Oct. 23-24 1989, 14 pp.

Primary Examiner—Gregory A. Heller
Attorney, Agent, or Firm—Millen, White and Zelano

[57] ABSTRACT

A method of reducing the NO content of a gas stream comprises contacting the gas stream with an amount of HNCO at a temperature effective for heat-induced decomposition of HNCO, said amount and temperature being effective for resultant lowering of the NO content of the gas stream, said solid agent being particulate and having a particle size of less than 90 μm.

10 Claims, 1 Drawing Sheet

NO REDUCTION USING SUBLIMATION OF CYANURIC ACID

The U.S. Government has rights in this invention pursuant to Contract No. DE-AC04-76DP-00789 between the U.S. Department of Energy and AT&T Technologies, Inc.

This is a division of application Ser. No. 07/154,247 now U.S. Pat. No. 4,908,193, filed Jan. 5, 1988, which is a continuation-in-part of Appln. Ser. No. 06/859,951, filed May 5, 1986, now U.S. Pat. No. 4,731,231, which is the National Phase of PCT/US87/01029 of May 5, 1987.

BACKGROUND OF THE INVENTION

This invention relates to a new method and device for removing $NO_x$ from gaseous material, e.g., from exhaust gas streams.

The recent emphasis on ecological and environmental concerns, especially air pollution, acid rain, photochemical smog, etc., has engendered a wide variety of proposed methods for removing $NO_x$, especially NO from gas streams.

Certain proposed techniques involve a great deal of capital outlay and require major consumption of additives, scrubbers, etc. For example, U.S. Pat. No. 3,894,141 proposes a reaction with a liquid hydrocarbon; U.S. Pat. No. 4,405,587 proposes very high temperature burning with a hydrocarbon; U.S. Pat. No. 4,448,899 proposes reaction with an iron chelate; and U.S. Pat. No. 3,262,751 reacts NO with a conjugated diolefin. Other methods utilize reactions with nitriles (U.S. Pat. No. 4,080,425), organic N-compounds (e.g., amines or amides) (DE 33 24 668) or pyridine (J57190638). Application of these reactions imposes organic pollutant disposal problems along with the attendant problems of toxicity and malodorous environments. In addition, they require the presence of oxygen and are relatively expensive.

Other systems are based on urea reactions. For example, U.S. Pat. No. 4,119,702 uses a combination of urea and an oxidizing agent which decomposes it, e.g., ozone, nitric acid, inter alia; U.S. Pat. No. 4,325,924 utilizes urea in a high temperature reducing atmosphere; and U.S. Pat. No. 3,900,554 (the thermodenox system) utilizes a combination of ammonia and oxygen to react with nitric oxide. All of these methods must deal with the problem of the odor of ammonia and its disposal. All require oxygen or other oxidizing agents. These methods also suffer from the drawback of requiring controlled environments which make them difficult to use in mobile vehicles or smaller stationary devices.

Japanese Publication J55051-420 does not relate to the removal of nitric oxide from gaseous systems, at least as reported in Derwent Abstract 38871C/22. It utilizes halocyanuric acid to remove malodorous fuses, e.g., mercaptans, sulfides, disulfides, ammonia or amines from gases by contact therewith followed by contact with activated carbon. Temperatures are reported as less than 80° C.; classical acid/base interactions appear to be involved (not pyrolysis decomposition products of the halocyanuric acid).

Back et al, Can. J. Chem. 46, 531 (1968), discusses the effect of NO on the photolysis of HNCO, the decomposition product of cyanuric acid. An increase of nitrogen concentration in the presence of large amounts of nitric oxide (torr levels) was observed utilizing a medium pressure mercury lamp for photolysis of HNCO. High temperature reactions were neither addressed nor involved; similarly, the effect, if any, of HNCO under any conditions on low amounts of NO (e.g., in the < torr to ppm range) was also not addressed. In fact, the increased concentration of nitrogen was associated by the author with high NO levels. Their theorized reactions explaining the results would be important only at high NO levels.

Furthermore, use of cyanuric acid as a source of isocyanic acid (HNCO) for purposes of studying various properties of the latter or its subsequent degradation products is also known. See, e.g., Okabe, J. Chem. Phys. 53, 3507 (1970) and Perry, J. Chem. Phys., 82, 5485 (1985). J.P. 53-28771 discloses the addition of relatively large particles (0.1-10 mm, preferably 0.5-5.0 mm) of cyanuric acid at temperatures generically disclosed as 600°-1500° C., but preferably at high temperatures of 1200°-1300° C., for removal of $NO_x$ from exhaust gas. The theory of operation disclosed in this publication appears to involve a reaction occurring on the surface of the particle which leads to the requirements of the high particle size and high temperature. It is explicitly stated in the publication that, "If the diameter of the granule is too small, the efficiency goes down." There is no suggestion in this publication that the active species effecting the treatment of the exhaust gas is itself gaseous and certainly no suggestion that the gaseous species is HNCO. As a result, the conditions disclosed in this reference lead away from those which are most applicable to a reaction of $NO_x$ with gaseous HNCO. Consequently, the process of this reference is believed not to have been used on a technical scale.

As a result, there continues to be a need for a simple, relatively inexpensive, non-polluting, non-toxic, non-malodorous and regenerable system, method and device for removing nitric oxide from gas streams.

SUMMARY OF THE INVENTION

Accordingly, it is an object of this invention to provide such a system, method and device.

It is another object of this invention to provide such a method, system and device which is applicable to small stationary devices, mobile vehicles, as well as to larger applications, including smokestacks from plants, furnaces, manufacturing, factories, kilns, vehicles, and essentially any other source of exhaust gas containing NO, particularly industrial gases.

Upon further study of the specification and appended claims, further objects and advantages of this invention will become apparent to those skilled in the art.

These objects have been attained by this invention by providing a method of reducing the NO content of a gas stream comprising contacting the gas stream with HNCO at a temperature effective for heat induced decomposition of HNCO and for resultant lowering of the NO content of the gas stream. It is preferred that the HNCO be generated by sublimation of cyanuric acid.

In another aspect, these objects have been achieved by providing a device useful for reducing the NO content of a gas stream comprising:

means for storing a compound which upon sublimation generates HNCO;

means for subliming said compound in operation;

means for contacting said NO-containing gas stream with said generated HNCO; and means for raising the temperature of said gas contacted with HNCO to a level effective for heat induced decomposition of HNCO and resultant lowering of the NO content of the gas stream.

In yet another aspect, these objects have been achieved by providing in a conduit means for an effluent gas stream containing NO, the improvement wherein the conduit means further comprises device means for lowering the NO content of said gas, said device means comprising:

compartment means for storing a compound which upon sublimation generates HNCO;

means for heating said compound to a temperature at which it sublimes;

means for contacting said NO-containing gas stream with said generated HNCO; and means for raising the temperature of said HNCO-contacted gas stream to a level effective for heat induced decomposition of HNCO and resultant lowering of the NO content of the gas stream;

and by providing a method of reducing the NO content of a gas stream comprising contacting the gas stream with an amount of HNCO at a temperature effective for heat induced decomposition of HNCO, said amount and temperature being effective for resultant lowering of the NO content of the gas stream, wherein said contacting is carried out in the presence of a surface which is effective as a catalyst for at least one of the reactions between heat induced decomposition products of HNCO and other components in said gas stream, which reactions lead to lowering of the NO content of the gas stream, or is effective as a catalyst for generating free radicals in the thermal decomposition of HNCO;

and a method of reducing the NO content of a gas stream comprising contacting the gas stream with an amount of HNCO at a temperature effective for heat induced decomposition of HNCO, said amount and temperature being effective for resultant lowering of the NO content of the gas stream and wherein said contacting is conducted under conditions whereby the reactions lowering said $NO_x$ content occur substantially solely in the gas phase between $NO_x$ and the products of said decomposition of HNCO and not on the surfaces of any solid particles added to the gas stream.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DISCUSSION

Figure 1:
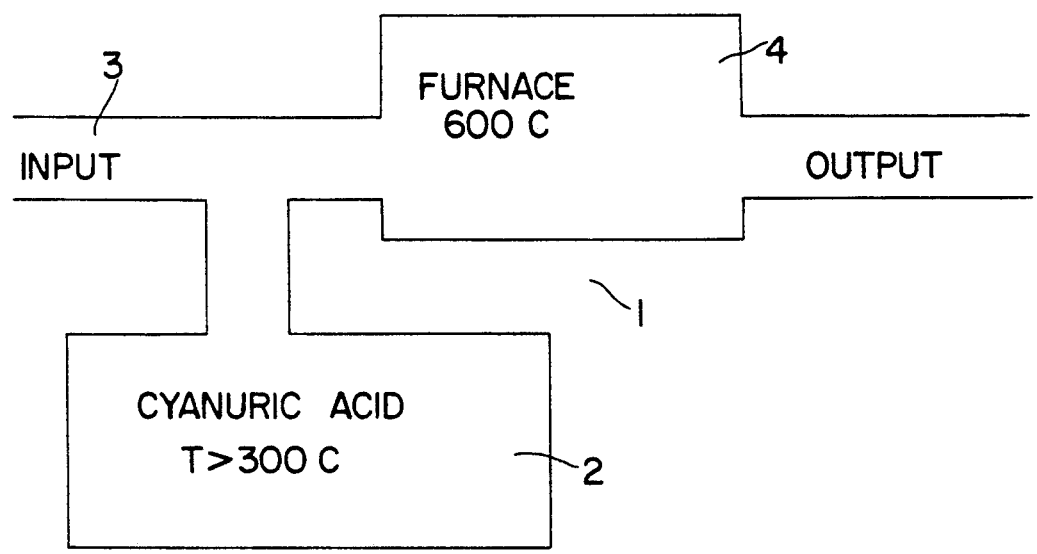
FIG. 1 schematically illustrates one possible configuration for carrying out the method of this invention and for configuring the device and/or improved conduit of this invention.

This invention provides many significant advantages over other theoretical and/or commercially available NO reducers. It is generically applicable to all industrial gas effluent streams, e.g., those mentioned in the references discussed above. It is very simple, inexpensive and portable. It does not require the use of catalysts and/or co-agents. In addition, when the preferred source of HNCO (cyanuric acid) is spent during operation, it can be simply and inexpensively replaced. It provides heretofore unachievable convenience and efficiency in reducing NO. Its non-toxicity is another major advantage as its ready availability and low cost.

As opposed to many of the other systems now available, that of this invention imposes minimal changes in otherwise preferred operating conditions for the engine, plant, factory, etc., which generates the effluent gas stream being purified. For example, as opposed to presently utilized catalytic converters, this invention does not impose a requirement that a vehicular engine be run rich with resultant undesirable lower compression ratios. In addition, the requirement for use of unleaded gas in order to avoid catalyst poisoning also does not apply. Overall, the efficacy of the system of this invention in lowering NO contents is extremely high.

Within the broadest scope of this invention, any source and/or means of generating HNCO and admixing it with the effluent stream can be used. For a variety of reasons including those discussed above, in the preferred embodiment sublimation of cyanuric acid will be utilized:

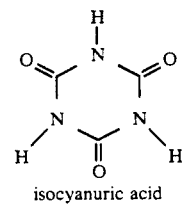
isocyanuric acid

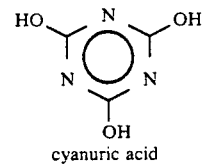
cyanuric acid

Isocyanuric acid is a tautomer of cyanuric acid. For purposes of this invention, the two are equivalent. The sublimation of cyanuric acid in accordance with the following equation,

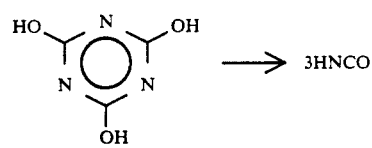

can be conducted at any temperature effective to cause a volatilization of sufficient HNCO for the desired purpose. In general, temperatures greater than 300° C. will be utilized since sublimation rates at lower temperatures are generally too low. Preferably, temperatures greater than 320° C. will be used, especially greater than 350° C. There is no preferred upper limit on temperature; but generally a temperature less than about 1200° C. will be employed. The precise temperature for a given application can be routinely selected, perhaps with a few orientation experiments, in conjunction with considerations of the volume to be filled, the flow rate of the gas, the resultant residence time of the admixture of HNCO and NO in the effluent gas stream, the surface area of the HNCO source which is being sublimed and the sublimation rate which ensues in a given system upon selection of the given temperature. For example, for 50 g of a cyanuric acid sample having a surface area of about 20 cm², the sublimation rate achieved at a temperature of 450° C. is sufficient to reduce the NO level from a 50 l/m gas stream from 1000 ppm to essentially 0 ppm.

While cyanuric acid itself is the preferred source of HNCO, other sublimable solids can also be used for its generation. These include other compounds which are typical impurities in samples of cyanuric acid, including ammelide and ammeline

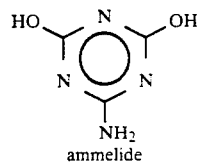
ammelide

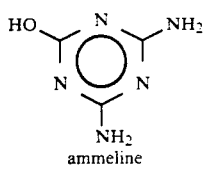
ammeline

In general, cyanuric acid wherein the OH groups are replaced by 1-3 $NH_2$, alkyl, NH-alkyl or N-alkyl$_2$ groups, are utilizable. Such alkyl groups typically will have 1-4 carbon atoms.

Also utilizable are oligomers of HNCO which are linear rather than cyclic as in cyanuric acid. For example, cyamelide is particularly noteworthy. Also utilizable are the known halocyanuric acids such as the mono-, di- or tri-chloro, bromo, fluoro or iodo acids or other various mixed-halo substituted acids.

Any means or technique which results in admixture of HNCO with the NO-containing gas is included within the scope of this invention. For example, if the effluent gas stream itself is at a sufficiently elevated temperature, it can be directly passed over a solid sample of the HNCO source to effect sublimation and instantaneous admixture. It is also possible to incorporate the solid HNCO source into a solvent therefor, most preferably hot water, and conventionally spray or inject the solution into the effluent gas stream. Of course, it is also possible to use conventional heating means (e.g., conductive, inductive, etc.) to heat the sublimable source of HNCO and then to conventionally conduct the resultant HNCO gas into admixture with the effluent stream. Steam injection preceded by passage of the steam over, through, etc., the HNCO source such as cyanuric acid can, of course, also be utilized.

It is also possible to indirectly admix the HNCO with the effluent gas stream. For example, if the HNCO is injected into the combustion chamber which produces the effluent gas stream or if the sublimable source such as cyanuric acid is so injected, the HNCO will be incorporated into the effluent gas stream at its point of generation. As long as the necessary reaction conditions are maintained for subsequent interaction of the HNCO with the NO in the gas stream, the NO reduction method of this invention will be accomplished. The latter option pertains to any system which generates an NO-containing stream, including vehicular engines (wherein the injection of cyanuric acid or HNCO can be accomplished via the conventional valves), furnaces, plants, etc. Alternatively, the admixture can be effected directly either downstream from the point of generation of the effluent gas or directly near or at this point, e.g., right at the head of the vehicular engine where the heat generated by the latter can be utilized, not only for sublimation of the solid source of HNCO, but also for effecting the NO reducing reactions based on the presence of HNCO.

The NO content of the effluent streams into which the HNCO has been admixed will be lowered as long as the temperature of the effluent stream is raised to a level at which HNCO thermally decomposes into products which result in lowering of the NO content. However, there will be an upper limit beyond which the nature of the predominant reactions ensuing from the decomposition of HNCO will change in such a fashion that the desired reduction in $NO_x$ will not occur. At elevated temperatures, greater than 1200° C., the presence of oxygen will make the production of nitric oxide unacceptable. Thus, the temperature at which the decrease in the effectiveness of this invention will occur is on the order of 1200° C. and higher.

More generally, the preferred upper limit on the temperature will be less than 1200° C. (e.g., less than 1190°) in dependence on the usual factors, including diameter of the effluent stream, its velocity, the particle size of the added HNCO-generating agent where applicable, the gas or particle injection technique and configuration, the residence time of the reaction, e.g., the length available for the reaction, the involved concentrations and amounts of $NO_x$ and agent of this invention, etc. Thus, in dependence on such factors, the upper limit can encompass a wide variety of values on the order of the mentioned "less than 1200° C.", e.g., less than values such as 1195°, 1190°, 1175°, 1150°, 1125°, 1100°, 1075°, 1050°, 1025°, 1000°, 975°, 950°, etc. Typically, the upper limit will fall in the range of 1100°-1200° C. or higher. This relatively lower temperature regime is one aspect of the present invention which clearly distinguishes it from the treatment of Jp 54-28771.

The preferred temperature of operation for a given system will again vary with the usual considerations such as those mentioned above. Typically, the higher available temperatures will be preferred because of the more favorable reaction kinetics associated therewith. Thus, reactions will often preferably be conducted in the range of 700°-1100° C., more preferably 900°-1050, especially 850°-1000° C. One of the major advantages of this invention is that the reaction, once initiated, will continue to occur to a substantial degree at significantly lower temperatures, i.e., from the sublimation point of the solid agent such as cyanuric acid up to these preferred temperatures. Thus, the reaction will ensue substantively at temperatures such as about 350°-700° C. or even lower, e.g., at temperatures of 400°-700° C. or 450°-600° C. or temperatures less than 600° C. For example, temperatures on the order of about 400° C. will often suffice where residence times are greater than or equal to about one second. For prior art systems, including the prior art system of JP 54-28771, by implication, substantial reduction of $NO_x$ at temperatures lower than the high temperatures typically required (e.g., less than about 900° C. for ammonia injection) does not occur.

On the other hand, for this invention, even when an exhaust gas stream reaches a low temperature, e.g., less than 600° C., substantial reduction of $NO_x$ in accordance with this invention will continue to occur. This represents a major advantage since exhaust gas streams inevitably cool during their passage from the point of generation. Thus, in those common situations where not all of the $NO_x$ is removed during the time that the exhaust gas stream is at the requisite high temperature of the prior art, this invention will continue to provide $NO_x$ reduction. This invention represents a very efficient technique both at temperatures greater than 600° C., e.g., 601° C. to the upper limit discussed above and also at temperatures less than 600° C., e.g., at temperatures from the lower limit discussed above up to 599° C.

Thus, in one unique aspect of this invention, there is provided a method for at least partially decreasing the concentration of $NO_x$ in an exhaust gas stream at a temperature less than 600° C., e.g., at a temperature less than or equal to 590° C., 570° C., 550° C., 500° C., 450° C., 400° C., etc.

The amount of $NO_x$ reduction which might occur at such heretofore inoperable, low temperatures will be a function of the usual parameters (see above) including the highest available temperature upstream, the residence time upstream, the $NO_x$ initial concentration, etc.

The temperature at which the HNCO or HNCO-generating solid is added to the exhaust gas stream will also be a function of the usual parameters including those mentioned above. Typically, it will be desired to achieve the HNCO presence at as high a temperature as possible within the constraints mentioned above and the availability of suitable energy. Since a free radical mechanism is involved, a suitably high initiation temperature will more quickly achieve a sufficiently high concentration of radicals to cause rapid achievement of an adequately high concentration of the active species to correspondingly quickly commence $NO_x$ reduction. Once free radical initiation ensues, the preference for high reaction temperatures will be lowered in accordance with the foregoing.

Another consequence of the discovery of this invention that HNCO is the active species, i.e., that the active species is itself gaseous in nature under the relevant conditions, is that certain particle size ranges will be preferred when the HNCO is not added directly to the gas stream as a gas, i.e., is added in the form of a solid which produces HNCO, e.g., a sublimable solid such as cyanuric acid. The basic principle is to produce the active gaseous species as quickly and efficiently as possible. Typically, the smaller the particle size the better, taking into the account the usual engineering considerations. Preferably, the average particle size will be less than 100 microns, e.g., less than or equal to about 95, or 90, or 80, or 70, or 60, or 50, or 40, or 30, or 20, or 10, etc. Typically, the preferred particle sizes will be in the range of 1 to less than 100 microns, most preferably in the range of from 10 to less than 100 microns. The precise particle size range preferred for a given application will be a function of the usual considerations including system temperature, exhaust stream diameter, available residence times, the efficiency and configuration of the injection system, etc.

As is well known, for smaller diameter streams, e.g., those typically encountered in vehicular systems, direct admixture of gaseous HNCO to the exhaust gas stream is typically preferred; for larger cross-section systems such as those encountered in typical smokestack exhausts, it is difficult to achieve adequate gas-gas mixing in the available times whereupon injection or other addition of particles is the preferred mode. It is also possible to inject a combination of particles and gaseous HNCO, e.g., by employing an injection configuration which provides the possibility for preheating the particles to be injected in a chamber whereupon both gaseous HNCO and solid material are introduced directly into the exhaust gas system. This also enhances the initiation of the reaction for the reasons discussed above. In a related embodiment, it is also preferred to include in the injection material (particles, gas or a mixture thereof), HNCO generating substances which have a particularly favorable decomposition profile such as ammeline.

Except as indicated otherwise herein, details of the mixing of the exhaust gas stream with solid particles or directly with gaseous HNCO will be in accordance with the usual conventional considerations as discussed thoroughly in the literature, e.g., in *Combustion and Mass Transfer*, D. Bryan Spalding, Pergammon Press 1979.

As discussed above, the preferred technique is addition of gaseous HNCO directly to the exhaust gas stream or addition of particles having diameters as discussed above. In other preferred aspects, the solid material can be added in the form of a solution in a solvent preferably hot water or as a slurry in an appropriate liquid, also preferably water, i.e., at a temperature where the solid agent is not fully dissolved. Other suitable solvents or dispersing fluids, e.g., liquid $CO_2$, $N_2$, etc., of course can also be used. These aspects provide ease of handling via conventional pumps.

Thus, for example, cyanuric acid can be dissolved in high temperature, high pressure water, especially in power plant environments where saturated water/steam is readily available, e.g., typically at 180° C. (150 psi). Solid or slurry injection can, for example, be accomplished by the use of a lead screw connecting the exhaust stream with the powder or slurry reservoir of the solid agent such as cyanuric acid. Steam injection is also preferred. Particle size considerations in such slurries will be in accordance with the foregoing. Where direct injection of gaseous HNCO is employed, it will be preferred to use a heated pre-chamber to avoid occasional plugging of metering devices where this may be a problem, e.g., due to polymerization of HNCO on cold surfaces.

As can be seen from the foregoing, this invention involves the discovery that HNCO can be used to very efficiently remove $NO_x$ from exhaust gas streams under conditions where the reaction with $NO_x$ occurs substantially solely in the gas phase with HNCO and not on the surfaces of particles of substances which can optionally be used to generate the HNCO. Accordingly, contrary to the disclosure of JP 54-28771, the conditions are to be chosen in order to facilitate the sublimation or other conversion of substantially all of such solid particles into gaseous HNCO before and/or during the reaction(s) which is effective to lower the $NO_x$ concentration.

In a further feature of this invention, it has been discovered that the underlying process is relatively insensitive to prior art interferants including particulates such as fly ash and oxygen. Because of its unique features, it is especially advantageously applicable to systems which heretofore have presented a relatively severe $NO_x$ problem such as systems based on diesel or coal combustion, e.g., boilers, smokestack exhausts, etc.

Pressure is typically not a critical variable under all realistic applications. Thus, pressures in the range from about 0.1–10 atmospheres as well as lower or higher values are employable.

The relative amounts of NO or HNCO are not critical. Typically, the system will be designed so that approximately stoichiometric amounts are employed. Of course, excesses of either ingredient can be designed where desirable. In many applications, it will be desired to utilize very slight, environmentally acceptable excesses of NO in order to avoid excesses of HNCO. The latter is an acid which might recyclize to cyanuric acid at the low temperatures ensuing after the reaction has run its course. Thus, since the excess of NO can be chosen to be benignly low in view of the great efficacy of this invention in reducing NO contents, and since the products of the overall NO-reduction reactions are nitrogen, carbon dioxide, water and carbon monoxide (with a minor component of CO), the resultant system containing benign amounts of NO will cause no environmental concerns Of course, where otherwise desirable, the system can also be run with slight excesses of HNCO. Where excesses are employed of either ingredient, these can, e.g., be in the range of about 1.01 to about 1.1 or more on a stoichiometric basis. However, it also will often be desirable to use larger excesses of HNCO to ensure the optimum $NO_x$ removed, e.g., molar equivalent excesses in the range of 1.1-10/1, typically less than 5/1, 4/1, 3/1, 2/1, etc., or generally in the range of 1/1 to 5/1, etc.

In a preferred mode of operation of this invention, the NO reduction reactions will be conducted in the presence of surfaces which act as a catalyst for the free radical reactions which effect the NO reduction. The nature of the surface is not critical as long as it is catalytically effective, metallic or otherwise. All those surfaces well known to catalyze related free radical reactions will be employable, e.g., metallic surfaces, oxides, etc. For metallic systems, preferably, the metal component will be iron which will typically be provided by the steel, stainless steel, or other iron-based surfaces utilized in plants, vehicles, factories, etc., and especially utilized in the conduits containing effluent gas streams, e.g., mufflers, smokestacks, etc. Other typical metals include the usual transition metals, e.g., the noble metals, including platinum, palladium, rhodium, silver, gold, etc. as well as nickel, cobalt, chromium, manganese, vanadium, titanium, etc. In a further preferred embodiment, the reaction will be conducted in a chamber containing particles of such catalytic surfaces, e.g., pellets, beads, granules, etc. The particle sizes and distributions are not critical. As usual, the greater the surface area, the more efficient this effect will be. Where catalytic surfaces are utilized, residence times can be shorter and temperatures can be lower under otherwise identical conditions. Without wishing to be bound by theory, it is felt that the catalytic effect is primarily exerted in initiating the generation of free radicals triggering chain reactions necessary for the NO reduction.

Other components may also be present in the NO-containing stream without adversely impacting this invention. For example, where $NO_2$ is involved, it also will be removed by this invention. However, under the normal conditions where NO is a problem, $NO_2$ often is not a problem. The amount of NO in the effluent gas stream also is not critical. Typically, the amounts will be 1 ppm or more, e.g., 1-10,000 ppm or 10-5,000 ppm, typically 100-1,000 ppm, etc. By routine, judicious selection of reaction conditions as described above, the amount of NO after admixture with HNCO can be reduced to any desired low level, including 0 ppm within limits of detection. Greater reductions in NO contents in a given system can be achieved by utilizing longer residence times and higher temperatures.

FIG. 1 illustrates one embodiment of a system of this invention. The overall "device" simply comprises means such as chamber 2 for holding the sublimable compound; means for heating the latter to its sublimation temperature, e.g., in FIG. 1 the means simply being the input gas stream 3 which is at an elevated temperature; means for contacting the resultant HNCO with the input stream, which here simply comprises the adjoining conduits whereby the input stream heats the cyanuric acid and the resultant HNCO is instantaneously mixed with the input stream; and means for conducting the reaction, here illustrated by furnace 4. Many other equivalents will be very clear to skilled workers. For example, one or both of the storage chamber and the furnace can be inductively, conductively, radiatively, etc., heated using external sources other than the input stream itself. One or both of storage chamber and furnace region can be located anywhere along the path of the effluent stream, e.g., they can be located right at the head of an engine or the exhaust outlet of a furnace or plant. As discussed above, it is even possible for the storage means to be located upstream of the chamber which produces the effluent stream where this is practical. Conventional heat exchange means can also be incorporated into the system wherever desirable. In FIG. 1, the heat exchange means is the input gas itself.

Without wishing to be bound by theory, the following is a proposed mechanism for the NO reduction system:

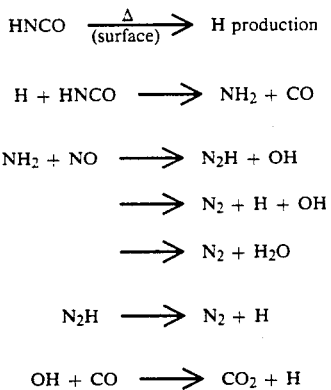

As can be seen, free radicals are generated which cause chain reactions to ensue. This explains both the speed and high efficiency of the system in removing NO from the gas stream. The reaction mechanism is highly surprising since the weakest bond in the HNCO molecule has a strength of about 85 kcal whereupon it would have been expected that a much higher temperature than those in the range of 400°-800° C. would be necessary for a significant effect based on decomposition of HNCO.

This mode of action also serves to further clarify the distinction between this invention and the more conventional chemistry known for HNCO, e.g., that is described in Back et al., supra. In the latter, no elevated temperatures were used; only a purely photolytic decomposition of HNCO was effected. In addition, the lowering of NO content mentioned in this reference related only to relatively high pressures of NO in the several torr range.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by volume.

The entire text of all applications, patents and publications, if any, cited above and below are hereby incorporated by reference.

EXAMPLE 1

A 7.2 horsepower Onan diesel engine was utilized for the experiment. Its exhaust had a flow-rate of 100 l/m. A 2 l/m sample was introduced into a cyanuric acid sublimation chamber. The latter contained 50 g of cyanuric acid and the sublimation occurred at 350° C. Thereafter, the mixture of HNCO and exhaust gas was passed through a furnace region packed with a bed of steel ball bearings. The temperature in the furnace region was maintained at a temperature equal to or greater than 450° C. utilizing a conventional heater. The effluent from the furnace region was passed into a $NO_x$ analyzer. The residence time in the furnace was about 1 second.

The exhaust gas from the diesel engine included the usual soot, water, oxygen and $CO_2$. Its 500 ppm NO content was reduced to less than 1 ppm (i.e., to the sensitivity level of the $NO_x$ analyzer). The load on the engine varied from 0.23 to 0.8 with no effect observed on the process.

EXAMPLE 2

Under the conditions of Example 1, 5 pounds of cyanuric acid (2.27 kg) is loaded into the holding chamber. This provides enough active ingredient (53 moles of HNCO) to remove approximately 50 moles of NO. At a typical NO concentration in a vehicle exhaust of 500 ppm, $2.5 \times 10^7$ liters of gas can be scrubbed. This is sufficient to remove NO from the exhaust gas of automobiles for a driving range of approximately 1,500 miles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of reducing the NO content of a gas stream comprising contacting the gas stream with an amount of cyanuric acid, said amount being effective for resultant lowering of the NO content of the gas stream, said cyanuric acid being particulate and having a particle size of less than 90 μm, said NO reduction being effected by chemical reactions conducted at temperatures in the range of 350°-700° C.

2. A method of claim 1, wherein said particle size is less than 70 μm.

3. A method of claim 1, wherein said particle size is less than 50 μm.

4. A method of claim 1, wherein the particle size of cyanuric acid is 10-90 μm.

5. A method of claim 1, wherein said gas stream is exhaust from a diesel engine.

6. A method of reducing the NO content of a gas stream comprising contacting the gas stream with an amount of a solid agent which thermally decomposes to form HNCO said amount being effective for resultant lowering of the NO content of the gas stream, said solid agent being particulate and having a particle size of less than 90 μm, said NO reduction being effected by chemical reactions conducted at temperatures in the range of 350°-700° C.

7. A method of claim 6, wherein said particle size is from 1 to less than 90 μm.

8. A method of claim 7, wherein said particle size is less than 70 μm.

9. A method of claim 7, wherein said particle size is less than 50 μm.

10. A method of claim 6, wherein said gas stream is exhaust from a diesel engine.

* * * * *